United States Patent Office 3,488,016
Patented Jan. 6, 1970

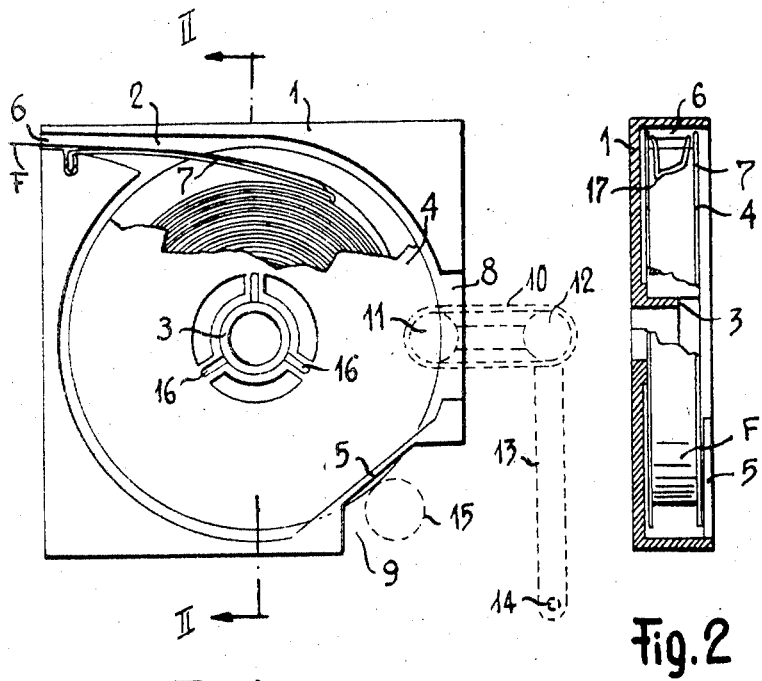

3,488,016
CASSETTE FOR A SPOOL BEARING A MAGNETIC TAPE OR CINEMATOGRAPHIC FILM
Bob Mouissie, Vaud, Switzerland, assignor to Paillard S.A., Vaud, Switzerland, a company of Switzerland
Filed Nov. 21, 1967, Ser. No. 684,754
Claims priority, application Switzerland, Dec. 1, 1966, 17,282/66
Int. Cl. G11b 23/04, 15/32; G03b 1/04
U.S. Cl. 242—197　　　　　　　　　　　　　　11 Claims

ABSTRACT OF THE DISCLOSURE

A cassette for housing a spool of magnetic tape or movie film and having a seating for the spool and an opening for the passage of the unwound tape or film, has a guide elastically supported against the spool and extending to the opening. A second opening in the cassette enables access of a member for propelling the tape or film towards the guide. The spool may be driven by one of its sides through an opening in the cassette or by its hub through a projection at the centre of the seating of the cassette. An extension on an open side of the cassette may be provided to prevent inadvertent emergence of the spool or its contents. The guide may be a U-shaped wire bent so as to contact only an image-free edge of the tape or film.

---

In certain applications, especially in the projection of cinematographic films, it is useful to be able to bring spools of film successively into projection position and to arrange means enabling the unwinding of a short length of the film to make possible its take-up by self-threading means for the latter in the projection apparatus. The same problem could also occur in the case of sound or video reproduction of a recording made on magnetic tape.

An objection of the invention is an arrangement permitting an easy unwinding of the outer end of a wound elongated body in order to make possible its take-up by automatic means.

According to the invention, a cassette intended to receive a spool bearing an elongated body such as a magnetic tape or a cinematographic film, and having a seating for said spool and a first opening to enable the passage of the elongated body when it is unwound from the spool, comprises a guide member elastically supported against the winding of the spool and extending up to the vicinity at least of said first opening, and a second opening arranged opposite the winding of the spool to enable the access of a driving member for the elongated body to push it in the direction of the guide member.

In order that the invention may be more clearly understood, one embodiment thereof is described below, purely by way of illustrative example and with reference to the accompanying drawing in which:

FIG. 1 shows diagrammatically a lateral view of a cassette according to the invention, and FIG. 2 is a sectional view along the line II—II of FIG. 1.

Referring to the drawing, the cassette is formed by a block 1 of moulded material, preferably of thermosetting resin. This cassette has externally a parallelopipedic form. Internally it has a seating 2 of circular cylindrical form at the centre of which occurs a cylindrical projection 3 constituting a pivot for a spool 4.

The diameter of the seating 2 appreciably corresponds with that of the sides of the spool 4. The seating 2 is open on one of the principal faces of the cassette, and the edge of its opening has an extension 5 extended towards the centre of the seating so as to cover over a portion of the outer face of the spool 4, so as to oppose an emerging movement of the spool out of the cassette.

The cassette has also an opening 6 which enables the passage of the film F which has to be unwound from the spool 4. In the vicinity of this opening 6 is fastened a guide member 7 formed by a steel wire curved in the general shape of a U and supported elastically against the winding of the film on the spool.

The cassette has also two openings 8 and 9 to enable the driving of the film and of the spool respectively. The driving of the film has the object of causing the film to emerge from the cassette and is achieved by a driving member, shown in discontinuous line in the drawing, constituted by a rubber band turning on two pulleys 11 and 12 fixed at the end of a bent arm 13, hinged at 14. The driving of the film is achieved by rubbing of the rubber band against the film itself and causes the outer spiral of the film to turn until its end comes into contact with the guide member 7. At this moment, the end of the film is separated from the winding by the said member and led up to the opening 6 through which the film passes to emerge from the cassette.

The opening 9 of the cassette is intended to enable the rewinding of the film on the spool by driving the spool in rotation by means of a rubberised pulley 15 supported against the periphery of one of the sides of the spool.

As a variation, the rewinding would also be effected by acting directly on the hub of the spool, so that the opening 9 for the pulley 15 could be eliminated. The driving of the hub of the spool can easily be effected, as this is well known in cinematographic projectors, by causing to pass into the hub of the spool a driving shaft provided with elastic radial projections intended to be gauged in radial notches 16 of the hub. Due to the fact that the projection 3 is hollow and does not extend over the whole length of the hub, this driving shaft could be arranged to reach the hub on one or other of the principal faces of the cassette.

When the elongated body wound on the spool 4 is a cinemotographic film, it is desirable to avoid the guide member 7 rubbing continually on the image surface of the film. To this end, and as shown in FIG. 2, the central branch of the U constituted by the steel wire has a bend 17 in a direction transverse to the plane tangential to the free end of the U. Thus, the central part of the U is only supported against one edge of the film, outside the region where the images occur.

Naturally, numerous modifications could be made in the cassette described, and especially the guide member could be constituted by a strip, for example, of plastics material, hinged in the vicinity of the opening 6 and subject to the action of a spring maintaining its free end in contact with the elongated body wound on the spool. Similarly, the cassette could be provided with a rotatable mounted pivot on which the spool would be fixed, so as to be able to control the rewinding of the film on the spool by the rotation of this pivot.

All such and other modifications are to be regarded as within the scope of the invention as defined in the appended claims.

What is claimed is:

1. A cassette intended to receive a spool bearing a coiled elongated flexible strip material, a seating in said cassette adapted to surround said spool, said seating communicating with a first opening through said cassette to permit the passage of the elongated strip material therethrough as it is unwound from said spool, a movable guide member attached to said cassette and extending from a point adjacent said first opening toward the interior of said seating, means resiliently urging the interior portion of said guide member into constant engagement with the winding of strip material upon the spool, said cassette provided with a second opening therethrough arranged opposite the winding of strip material on the spool whereby access is provided for driving means to engage the outermost winding of strip material on the spool to push it in the direction of said guide member, over same, and outwardly through said first opening.

2. A cassette according to claim 1, intended to receive a spool having two side flanges wherein said cassette is open opposite one said spool side flange in order to enable the driving of the spool by means accessible to said one spool side flange.

3. A cassette according to claim 1 wherein said seating is of circular form and of a diameter substantially corresponding to that of the periphery of the spool and said cassette includes a projection in the middle of said seating to form a pivot for the spool.

4. A cassette according to claim 1, wherein said seating is open on one of the faces of the cassette, the edge of this facing opening having at least one extension directed towards the centre of the facing opening and intended to cover a portion of the outer face of the spool placed in the seating, so as to retain the spool in the latter and prevent the elongated strip material from emerging through the facing opening of the seating.

5. A cassette according to claim 1, wherein said guide member comprises a steel wire, bent in the general form of a U, the ends of the branches of the U being fixed to the cassette, while the central part of the U is supported against the winding of strip material.

6. A cassette according to claim 5, wherein the central part of the U form in said wire has a bend in a direction transverse to a plane tangential to the free end of the U, so that the central part of the U is supported only on one edge of the winding of strip material.

7. A cassette according to claim 3, wherein said projection is hollow and cylindrical, so as to enable the passage of a shaft therethrough for the hub of the spool.

8. A cassette according to claim 2, where said seating is of circular form and of a diameter corresponding appreciably to that of said side flanges of said spool, the cassette having also a projection at the middle of this seating to form a pivot for the spool.

9. A cassette according to claim 3, wherein said seating is open on one of the faces of the cassette, the edge of this opening having at least one extension directed towards the centre of the facing opening and intended to cover a portion of the outer face of the spool placed in the seating, so as to retain the spool in the latter and prevent the elongated strip material from emerging through the facing opening of the seating.

10. A cassette according to claim 9, wherein said cassette has a third opening aranged opposite the periphery of said spool to enable access thereto in order to drive the spool by means of the periphery thereof, said guide of a U, the ends of the branches of the U being fixed to the member comprising a steel wire bent in the general form cassette, while the central part of the U is supported against the winding of the strip material upon the spool, the central part of the U having a bend in a direction transverse to a plane tangential to the free end of the U so that the U is supported only on one edge of the winding of the strip material.

11. A cassette intended to receive a spool on which an elongated web is wound, said cassette comprising a bottom wall with centering and bearing means for said spool, lateral walls forming a substantially cylindrical recess for said spool said lateral walls providing with a first opening to provide a passage for the web when it is unwound from the spool, a guiding surface on said lateral walls extending substantially tangentially to said cylindrical recess to said first opening, a guide member in said cassette, means elastically bearing the free end of said guide member against the outer turn of the winding of the web on the spool, said guide member extending up to the vicinity of said first opening and oscillating in a plane substantially parallel to said bottom wall, said guide member constituting a deflector for the free end of the elongated web and forming together with said guiding surface a channel adapted to lead the free end of said elongated web out of the cassette through said first opening when a driving member acting on said outer turn of the winding through a second opening provided in said lateral walls pushes its free end towards said guide member.

References Cited
UNITED STATES PATENTS

| 2,778,636 | 1/1957 | Eash. | |
| 3,191,882 | 6/1965 | Riedel | 242—55.13 |
| 3,208,682 | 9/1965 | Pastor et al. | 242—55.12 |

LEONARD D. CHRISTIAN, Primary Examiner

U.S. Cl. X.R.

274—11